Patented Oct. 2, 1923.

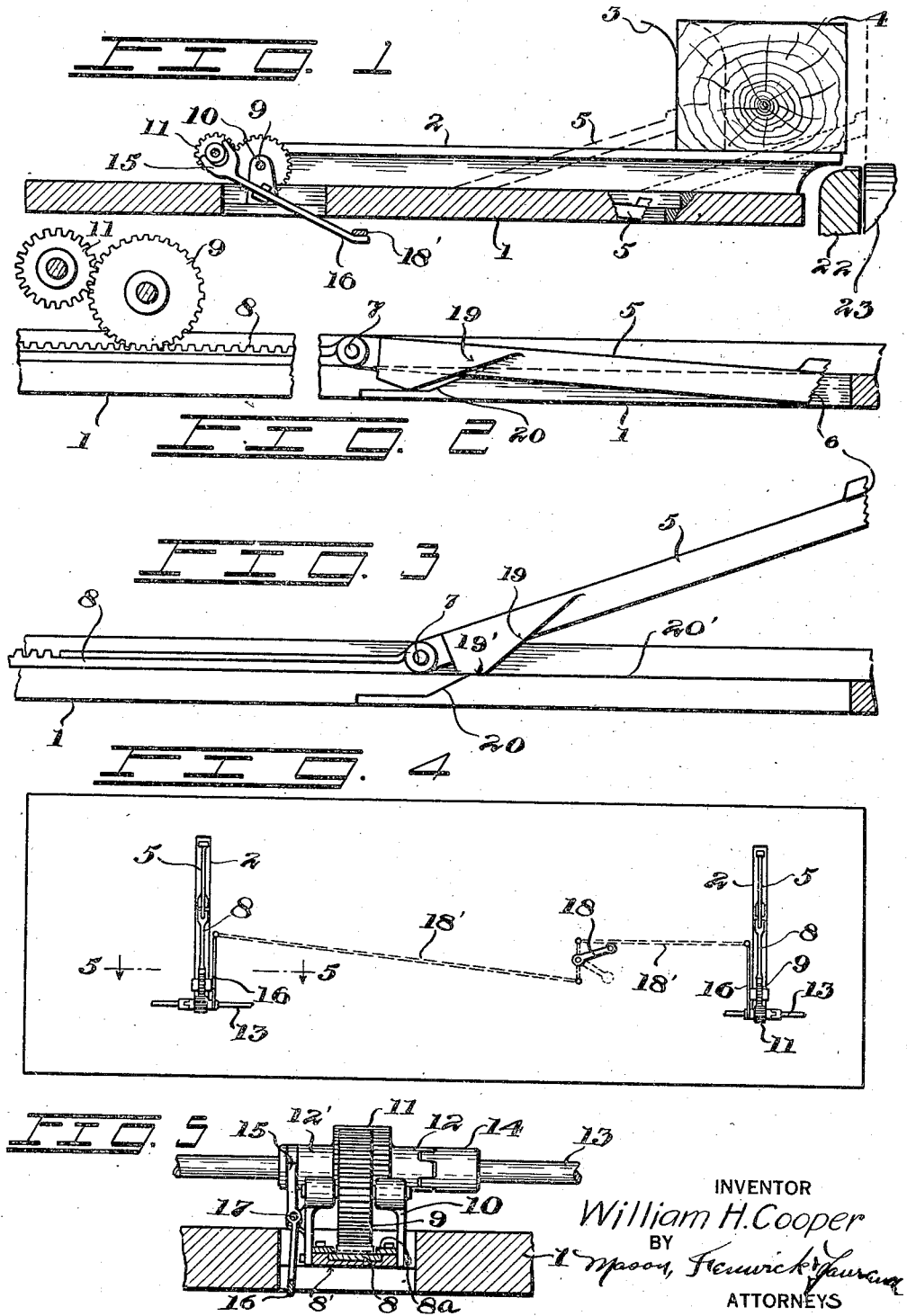

1,469,498

UNITED STATES PATENT OFFICE.

WILLIAM H. COOPER, OF SEATTLE, WASHINGTON.

APPARATUS FOR REMOVING TIMBERS FROM SAWMILL CARRIAGES.

Application filed July 10, 1922. Serial No. 573,783.

*To all whom it may concern:*

Be it known that I, WILLIAM H. COOPER, a citizen of the United States, residing at Seattle, in the county of King and State of Washington, have invented certain new and useful Improvements in Apparatus for Removing Timbers from Sawmill Carriages; and I do hereby declare the following to be a full, clear, and exact description of the invention, such as will enable others skilled in the art to which it appertains to make and use the same.

This invention relates to saw mill carriages, and more particularly to a device for unloading or discharging from said carriage the timbers on which sawing operations have been completed.

In common operation of saw mill carriages, the logs to be sawed are loaded upon one side of a reciprocating carriage, the saw being located beyond the side of the carriage and in close proximity thereto. As the log is carried along by the moving carriage, boards or the like are cut from the log, or the main body of the log may be squared or otherwise fashioned to form building timbers, as will be readily understood. Such carriages are provided with knees which are transversely movable on the carriages to slide the log toward the saw after each cut. These knees are usually moved step by step fashion to properly space the log with respect to the saw. Ejectment of the final timber from the carriage is commonly done by moving the knees toward the edge of the carriage until the timber is pushed off. This operation is slow and wasteful of time since the knees can be moved but comparatively slowly.

It is an object of this invention to provide means for quickly ejecting the final timber or log from the carriage. The invention in its preferred form, comprises a pair of push bars which are normally horizontally disposed on the carriage, means being provided for elevating the log or timber-engaging ends of said bars and for moving the push bars forward when it is desired to eject the log or timber from the carriage.

The novel features of the invention will appear from the detailed description thereof taken in connection with the accompanying drawings, in which—

Figure 1 is an irregular vertical section taken transversely of the carriage, a timber being shown on said carriage, and a platform onto which the timber is received when ejected from said carriage also being shown;

Fig. 2 is a similar vertical section taken somewhat closer toward the push bar, the view being on an enlarged scale, the log-supporting end of the carriage being omitted;

Fig. 3 is a fragmentary view similar to Fig. 2 showing the bar in elevated position;

Fig. 4 is a plan view of the carriage showing the arrangement of the push bars thereon, and Fig. 5 is a vertical section taken on line 5—5 of Fig. 4.

In the drawings, 1 represents the frame of any ordinary saw mill carriage, 2 the log-supporting cross rails at each end thereof, 3 the knees which are slidably mounted on said rails and which serve to space or maintain the log or timber at the edge of the carriage, said means being somewhat diagrammatically shown, and 4 designates a timber resting on said rails and against said knees. In the conventional carriage said knees are used not only for moving the timber toward the edge of the carriage into positive relation with the saw, but also to push the log off said carriage. The knees are moved by any suitable mechanism not shown in the present instance.

The improved log or timber push-off means is shown as a bar 5 having a head 6 adapted for engagement with the log or timber, said bar being pivoted as at 7 to a rack bar 8 which in the present instance, is designed to be moved by mechanism comprising a gear 9 mounted between brackets 10 which are suitably secured to the carriage frame 1 as to a plate 8' in which the rack bar is slidably mounted. 11 is a pinion meshing with gear 9, said pinion having hubs 12 and 12' and being slidably mounted on a driving shaft 13. One of the hubs 12 has axially extending teeth for engagement with the corresponding teeth on a collar 14 affixed to the shaft 13. The opposite hub 12' is provided with a groove which receives a jaw 15 of a clutch lever 16 which latter is suitably pivoted as at 17 to a lug projecting from one of the brackets 10. As already indicated, there is a pair of push bars 5 and each bar is preferably associated with the mechanism just described. In order to operate both push bar mechanisms jointly, there is provided a central control lever or handle 18 which is connected to the clutch levers by links 18', it being understood that the lever 18 is under the control of the operator on the carriage.

The push bar 5 is provided with a projection which in the present instance takes the form of an obliquely-extending cam 19 which is designed to cooperate with a cam 20 extending in the same general direction from a suitable support on the frame 1. The normal position of the push bar with respect to the cam 20 is shown in Fig. 2. When the push bar is moved forwardly or to the right, the cam 19 will ride up the inclined cam 20 and consequently, swing the push bar about its pivot 7. At the base of the cam 19 is a heel 19' adapted to slide on a track 20' after the cam or projection 19 has cleared the cam 20, this relation being shown in Fig. 3. The rack 8 and hence the pivot end of the push bar is held to a straight-away movement by any suitable means as by plates 8ª overlying the rack 8 (see Fig. 5). 22 is a bench or platform which is usually disposed alongside the saw side of the carriage. When the timber is ejected or shoved from the carriage it is received on said platform or bench, the latter being usually provided with rollers 23 to permit the timber to be moved away.

The normal position of the bar 5 is normally below the rails 2 as shown in Fig. 2. When the operator desires to move a timber from the carriage the levers 16 are moved to throw in the clutch, whereupon the gear 11 will rotate gear 9 which will move the rack bar 8, which in turn will move the push bar toward the cam end of the track and up the step or cam 20 at one end of the track 20'. Movement of the rack will be continued until the head 6 of the bar engages with the side of the timber and has pushed the same from the carriage as will now be understood. Inasmuch as the bars will be moved rapidly, the timber will be given a "kick" from the carriage. The bars are then returned to normal position as shown in Fig. 2, in the present instance by reversing the shaft 13. If desired, suitable reversing mechanism may be incorporated as part of the mechanism for moving the shaft forward. For simplicity of illustrating, a one-way driving means only has been shown in the drawings.

The cams or projections 19 on the push bar 5 are preferably disposed on opposite sides of the bar, there being tracks on either side of said bar on which said cams ride. These tracks, therefore, define a channel between which the push bar is disposed when out of use. The ends of the tracks which constitute cams 20 are, as will now be seen, stepped to provide said cams. The push bars are preferably disposed alongside of the rails 2.

While I have described the invention with considerable particularity of detail, I desire it to be understood that I intend no limitations except as may be imposed by the appended claims.

What I claim is:

1. In a sawyer's carriage, the combination of means for quickly removing timber from the carriage including a push bar, means for confining one terminal of said bar to a straight-away movement, a cam below the plane of said terminal, a projection depending from said bar adjacent said terminal, and means for translating said terminal toward and beyond said cam, said projection and cam imparting a swinging movement to the free end of said bar.

2. In a sawyer's carriage, the combination of means for quickly removing timber from the carriage including a push bar, means for confining one terminal of said bar to a straight-away movement, a cam below the plane of said terminal, a projection depending from said bar adjacent said terminal, means for translating said terminal toward and beyond said cam, said projection and cam imparting a swinging movement to the free end of said bar, and a track on which said abutment rides after passing said cam.

3. In a sawyer's carriage, the combination of means for quickly removing timber from the carriage including a push bar, means for confining one terminal of said bar to a straight-away movement, a cam below the plane of said terminal, a projection depending from said bar adjacent said terminal, a rack to which said terminal is hinged, a projection depending from said bar adjacent said terminal, a track on which projection may ride to maintain said bar at an oblique angle to said track, and a channel at one end of said track into which said projection may enter to lower the bar to inoperative position.

4. In a sawyer's carriage, the combination of means for quickly removing timber from the carriage including a push bar, means for confining one terminal of said bar to a straight-away movement, a cam below the plane of said terminal, a projection depending from said bar adjacent said terminal, a rack to which said terminal is hinged, a projection depending from said bar adjacent said terminal, a track on which projection may ride to maintain said bar at an oblique angle to said track, an incline at one end of said track down which said projection may ride to lower said bar.

5. In a sawyer's carriage, the combination of means for quickly removing timber from the carriage including a push bar, means for confining one terminal of said bar to a straight-away movement, a pair of tracks between which said bar is movable, said tracks at one of their terminals being inclined, projections depending from said bar adjacent one end thereof and overlying said tracks, a rack to which said bar is pivoted adjacent said projections, and means for moving said rack, said bar being initially swung about said pivot as the projections move up said inclined ends and adapted to slide on said tracks.

6. In combination, a saw mill carriage having knees for moving timber toward the edge of the carriage, spaced push bars normally disposed behind said knees, and means for moving said push bars beyond said knees for ejecting said timber out of contact with said knees.

In testimony whereof I affix my signature.

WILLIAM H. COOPER.